(12) United States Patent
Adamczyk et al.

(10) Patent No.: US 12,424,852 B2
(45) Date of Patent: Sep. 23, 2025

(54) ELECTRICAL ASSEMBLY WITH A DYNAMIC BRAKING SYSTEM

(71) Applicant: General Electric Technology GmbH, Baden (CH)

(72) Inventors: Andrzej Adamczyk, Stafford (GB); Carl Barker, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 657 days.

(21) Appl. No.: 17/741,078

(22) Filed: May 10, 2022

(65) Prior Publication Data

US 2022/0360161 A1 Nov. 10, 2022

(30) Foreign Application Priority Data

May 10, 2021 (EP) .................................... 21275056

(51) Int. Cl.
*H02J 3/36* (2006.01)
*H02J 1/10* (2006.01)
(Continued)

(52) U.S. Cl.
CPC ................ *H02J 3/36* (2013.01); *H02J 1/102* (2013.01); *H02M 1/0025* (2021.05); *H02M 1/08* (2013.01);
(Continued)

(58) Field of Classification Search
CPC .... H02M 1/0025; H02M 1/08; H02M 5/4585; H02M 7/217; H02M 1/32; H02M 5/4505;
(Continued)

(56) References Cited

U.S. PATENT DOCUMENTS 10,103,663 B1 * 10/2018 Wagoner ................. H02P 9/007
11,005,266 B2 * 5/2021 Gupta .................... H02H 3/087
(Continued)

OTHER PUBLICATIONS

European Search Report issued in EP21275056.6, dated Nov. 2, 2021, 11 pages.
(Continued)

*Primary Examiner* — Yusef A Ahmed
(74) *Attorney, Agent, or Firm* — Eversheds Sutherland (US) LLP

(57) ABSTRACT

An electrical assembly including a power converter having an AC side and a DC side, the AC side for connection to an AC network; at least one power transmission medium connected to the DC side of the power converter; a dynamic braking system operably connected to the power transmission medium, the dynamic braking system including a dynamic braking control unit programmed to selectively control activation of the dynamic braking system to carry out a dynamic braking operation; a monitoring unit for monitoring an electrical parameter of the AC network; and a processing unit programmed to determine an operating state of the AC network from the monitored electrical parameter, wherein the dynamic braking control unit is programmed to be responsive to the determined operating state of the AC network by configuring the dynamic braking system to be activatable.

12 Claims, 8 Drawing Sheets

(51) Int. Cl.
*H02M 1/00* (2006.01)
*H02M 1/08* (2006.01)
*H02M 5/458* (2006.01)
*H02M 7/217* (2006.01)
*H02M 1/32* (2007.01)

(52) U.S. Cl.
CPC ......... *H02M 5/4585* (2013.01); *H02M 7/217* (2013.01); *H02M 1/32* (2013.01)

(58) Field of Classification Search
CPC .. H02J 1/102; H02J 3/36; Y02E 60/60; H02H 7/26; H02H 7/268
See application file for complete search history.

(56) References Cited

U.S. PATENT DOCUMENTS

| | | | | |
|---|---|---|---|---|
| 11,211,878 | B2* | 12/2021 | Biris | H02J 3/381 |
| 11,563,385 | B2* | 1/2023 | Biris | H02M 7/4835 |
| 2010/0085783 | A1* | 4/2010 | Jiang-Hafner | H02J 3/381 |
| | | | | 363/35 |
| 2012/0049772 | A1* | 3/2012 | Moussaoui | H02M 3/1588 |
| | | | | 318/376 |
| 2012/0300510 | A1* | 11/2012 | Jensen | H02J 3/36 |
| | | | | 363/35 |
| 2013/0229739 | A1* | 9/2013 | Juhlin | H02M 1/32 |
| | | | | 361/86 |
| 2013/0334818 | A1* | 12/2013 | Mashal | F03D 7/0264 |
| | | | | 290/44 |
| 2016/0118786 | A1* | 4/2016 | Zhu | H02H 7/067 |
| | | | | 290/44 |
| 2016/0211669 | A1* | 7/2016 | Barker | H02H 7/1257 |
| 2017/0302189 | A1* | 10/2017 | Jakob | H02J 3/36 |
| 2018/0013280 | A1* | 1/2018 | Barker | H02H 7/262 |
| 2018/0145499 | A1* | 5/2018 | Gupta | H02H 7/268 |
| 2018/0198376 | A1* | 7/2018 | Wagoner | H02H 7/1216 |
| 2018/0241213 | A1* | 8/2018 | Gupta | H02H 3/087 |
| 2019/0245465 | A1* | 8/2019 | Anabarasu | H02K 7/183 |
| 2020/0067317 | A1* | 2/2020 | Whitehouse | H02J 3/36 |
| 2020/0067437 | A1* | 2/2020 | Wagoner | F03D 7/0244 |
| 2021/0050796 | A1* | 2/2021 | Biris | H02J 3/381 |
| 2022/0069751 | A1* | 3/2022 | Zhu | H02P 9/107 |
| 2022/0311354 | A1* | 9/2022 | Gerçek | H02J 3/381 |
| 2023/0318301 | A1* | 10/2023 | Kumar | H02M 7/7575 |
| | | | | 307/82 |
| 2024/0204519 | A1* | 6/2024 | Zou | H02M 7/4835 |
| 2024/0302452 | A1* | 9/2024 | Vudugula | G01R 31/52 |
| 2024/0356327 | A1* | 10/2024 | Prignitz | H02H 7/06 |

OTHER PUBLICATIONS

Wu, et al.: Modeling and control of multi-terminal HVDC with offshore wind farm integration and DC chopper based protection strategies. IECON 2013—39th Annual Conference of the IEEE Industrial Electronics Society, IEEE, pp. 1013-1018. Nov. 10, 2013.

* cited by examiner

ELECTRICAL ASSEMBLY WITH A DYNAMIC BRAKING SYSTEM

CROSS-REFERENCE TO RELATED APPLICATION

This application claims the priority benefit of European Application No. EP21275056.6, filed May 10, 2021, which is incorporated herein by reference.

This invention relates to an electrical assembly, preferably for use in high voltage direct current (HVDC) power transmission networks.

In HVDC power transmission networks alternating current (AC) power is typically converted to direct current (DC) power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance.

The conversion between DC power and AC power is utilised in power transmission networks where it is necessary to interconnect the DC and AC networks. In any such power transmission network, converters are required at each interface between AC and DC power to effect the required conversion from AC to DC or from DC to AC.

According to an aspect of the invention, there is provided an electrical assembly comprising:
- a power converter having an AC side and a DC side, the AC side for connection to an AC network;
- at least one power transmission medium connected to the DC side of the power converter;
- a dynamic braking system operably connected to the or each power transmission medium, the dynamic braking system including a dynamic braking control unit programmed to selectively control activation of the dynamic braking system to carry out a dynamic braking operation;
- a monitoring unit for monitoring an electrical parameter of the AC network; and
- a processing unit programmed to determine an operating state of the AC network from the monitored electrical parameter, wherein the dynamic braking control unit is programmed to be responsive to the determined operating state of the AC network by configuring the dynamic braking system to be activatable:
  (i) by a first activation trigger if the determined operating state of the AC network is a faulty operating state; and
  (ii) by a second activation trigger if the determined operating state of the AC network is a healthy operating state.

The AC network in the healthy operating state is capable of performing its function in accordance with its normal operating requirements. The AC network in the faulty operating state is incapable of performing its function in accordance with its normal operating requirements and/or is in a state of malfunction. The normal operating requirements may vary depending on the designed purpose of the AC network, such as power generation capability, power transmission capability and safety requirements.

The combination of the dynamic braking control unit, the monitoring unit and the processing unit of the electrical assembly of the invention results in a conditional operation capability of the dynamic braking system based on different activation triggers and different operating states of the AC network. As a result the dynamic braking system can be configured to be responsive to a wider range of situations requiring a dynamic braking operation, thus broadening the capability of the dynamic braking system.

The invention is applicable to a multi-terminal power transmission network, preferably a multi-terminal HVDC power transmission network. The electrical assembly of the invention may comprise a plurality of power converters and a plurality of power transmission media, the AC side of each power converter for connection to a respective AC network, the plurality of power transmission media interconnecting the DC sides of the power converters in a multi-terminal power transmission network configuration, the electrical assembly including a plurality of dynamic braking systems, each dynamic braking system corresponding to a respective one of the AC networks, wherein the electrical assembly may include a plurality of monitoring units, each monitoring unit configured for monitoring an electrical parameter of a respective one of the AC networks, wherein the electrical assembly may include a plurality of processing units, each processing unit programmed to determine an operating state of the corresponding AC network from the corresponding monitored electrical parameter, wherein each dynamic braking control unit may be programmed to be responsive to the determined operating state of the corresponding AC network by configuring the corresponding dynamic braking system to be activatable:
  (i) by a respective first activation trigger if the determined operating state of the corresponding AC network is a faulty operating state; and
  (ii) by a respective second activation trigger if the determined operating state of the corresponding AC network is a healthy operating state.

The invention is applicable to multi-terminal power transmission networks where one, some or all of the dynamic braking systems are configured to have the conditional operation capability based on first and second activation triggers and faulty and healthy operating states of the AC network.

Preferably the first and second activation triggers of the dynamic braking systems are selected so as to enable coordination of the activations of the dynamic braking systems to carry out their respective dynamic braking operations.

The conditional operation capability based on first and second activation triggers and faulty and healthy operating states of the AC network enables coordination of different dynamic braking systems in the multi-terminal power transmission network in ways that confer at least the following benefits:

Facilitates optimisation of the overall dynamic braking operation capability of the multi-terminal power transmission network by permitting independent design of equipment ratings of different dynamic braking systems to serve the needs of the respective power converters and AC networks;

Enables autonomous control of each dynamic braking system by removing or reducing the need for communication between each dynamic braking system and the or each other dynamic braking system, which is especially useful for when the dynamic braking systems are physically remote from each other;

Enables configuration of each monitoring unit to work with only locally available measurements, which further enhances the autonomous control of each dynamic braking system;

Allows implementation of the conditional operation capability as a logic module that can be added to existing dynamic braking system control algorithms without requiring any changes to the downstream functionality of the existing algorithms;

Removes or reduces the need for any additional coordination with the associated power converter.

It will be understood that the following features of the invention described with reference to the dynamic braking system is not limited to a single dynamic braking system in embodiments of the electrical assembly of the invention but instead apply mutatis mutandis to some or all of a plurality of dynamic braking systems in embodiments of the electrical assembly of the invention.

The monitored electrical parameter of the AC network may be any electrical parameter that enables evaluation and thereby determination of the operating state of the AC network. Non-limiting examples of the monitored electrical parameter of the AC network include an AC voltage of the AC network, an impedance of the AC network, an AC current of the AC network, a rate of change of AC current of the AC network, a frequency of the AC network and a rate of change of frequency of the AC network.

In embodiments of the invention, the processing unit may be programmed to determine the operating state of the AC network as:
(i) a faulty operating state when the monitored electrical parameter is not at a reference electrical parameter value or is not within a reference electrical parameter range; and
(ii) a healthy operating state when the monitored electrical parameter is at a reference electrical parameter value or is within a reference electrical parameter range.

The first and second activation triggers may correspond to different types of events requiring a dynamic braking operation or may correspond to the same type of event requiring a dynamic braking operation. The first and second activation triggers may correspond to different types of electrical parameters indicative of a requirement for a dynamic braking operation or may correspond to the same type of electrical parameter indicative of a requirement for a dynamic braking operation.

The first activation trigger may correspond to a wide range of situations requiring a dynamic braking operation, non-limiting examples of which are set out as follows.

In further embodiments of the invention, the first activation trigger may correspond to a DC voltage of the or each power transmission medium exceeding a first reference DC voltage threshold. The first reference DC voltage threshold is set above a steady-state operating DC voltage of the or each power transmission medium so as to avoid accidental dynamic braking operation during steady-state operation of the electrical assembly.

In such embodiments, the dynamic braking control unit may be programmed to reduce the first reference DC voltage threshold if the determined operating state of the AC network is a faulty operating state. The reduced first reference DC voltage threshold is set above the steady-state operating DC voltage of the or each power transmission medium.

Reducing the first reference DC voltage threshold in this manner reduces the voltage stress experienced by the or each power transmission medium during a transient scenario.

In further such embodiments, the dynamic braking control unit may be programmed to configure the first reference DC voltage threshold as a function of an AC voltage of the AC network. This enable the dynamic braking operation to be adapted in accordance with the severity of the faulty operating state of the AC network.

For example, when the dynamic braking control unit is programmed to configure the first reference DC voltage threshold as a function of an AC voltage of the AC network, the dynamic braking control unit may be programmed to:
(i) reduce the first reference DC voltage threshold when the AC voltage of the AC network is not at a reference AC voltage value or is not within a reference AC voltage range; and
(ii) maintain the first reference DC voltage threshold when the AC voltage of the AC network is at a reference AC voltage value or is within a reference AC voltage range.

Furthermore, the dynamic braking control unit may be programmed to reduce the first reference DC voltage threshold by an amount proportional to a difference between the AC voltage of the AC network and the reference AC voltage value or range when the AC voltage of the AC network is not at the reference AC voltage value or is not within the reference AC voltage range. This enables reduction of the first reference DC voltage threshold in proportion to the severity of the faulty operating state of the AC network.

Optionally the first reference DC voltage threshold may be configured to have a first time-varying DC voltage profile in which the first reference DC voltage threshold varies with time. Preferably the first reference DC voltage threshold is configured to have a first time-varying DC voltage profile in which the first reference DC voltage threshold increases with time.

The provision of the first time-varying DC voltage profile allows optimisation of the selective activation by the first activation trigger, particularly in embodiments where the dynamic braking control unit initially reduces the first reference DC voltage threshold in response to the determined operating state of the AC network being a faulty operating state.

In still further embodiments of the invention, the second activation trigger may correspond to a DC voltage of the or each power transmission medium exceeding a second reference DC voltage threshold.

When the first and second activation triggers correspond to the same type of electrical parameter, the first and second activation triggers may be configured to correspond to different values or ranges of the same type of electrical parameter. For example, the second reference DC voltage threshold may be higher than the first reference DC voltage threshold.

This provides a reliable means of selectivity between preferred and non-preferred dynamic braking systems to accommodate various transient scenarios. For example, in embodiments of the invention employing multiple dynamic braking systems having the conditional operation capability, configuring the second reference DC voltage threshold to be higher than the first reference DC voltage threshold ensures that activation of a dynamic braking system associated with an AC network in a faulty operating state will take place first before activation of another dynamic braking system associated with an AC network in a healthy operating state, provided that the dynamic braking systems are available. This enables a preferred dynamic braking system to carry out the dynamic braking operation and at the same time provides another dynamic braking system as a back-up to carry out the dynamic braking operation once the second reference DC voltage threshold is exceeded.

Optionally the second reference DC voltage threshold may be configured to have a second time-varying DC voltage profile in which the second reference DC voltage threshold varies with time. Preferably the second reference DC voltage threshold is configured to have a second time-varying DC voltage profile in which the second reference DC voltage threshold decreases with time.

The provision of the second time-varying DC voltage profile allows optimisation of the selective activation by the second activation trigger, particularly in embodiments where the dynamic braking control unit initially sets the second reference DC voltage threshold to be higher than the first reference DC voltage threshold.

The conditional operation capability of the dynamic braking system may include an activation time delay. For example, the dynamic braking control unit may be programmed to configure the dynamic braking system to:
(i) be activatable by the first activation trigger and inhibited from being activated by the second activation trigger during an activation time delay; and
(ii) be activatable by the second activation trigger after the activation time delay.

The provision of the activation time delay provides another reliable means of selectivity between preferred and non-preferred dynamic braking systems to accommodate various transient scenarios. This enables a preferred dynamic braking system to carry out the dynamic braking operation and at the same time provides another dynamic braking system as a back-up to carry out the dynamic braking operation if the preferred dynamic braking system does not carry out the dynamic braking operation within the activation time delay.

The requirement for dynamic braking operation may be evaluated on the basis of a power exchange level of the power converter that is indicative of the net power of the or each power transmission line. In embodiments of the invention, the first activation trigger may correspond to a power difference between a target power exchange level of the power converter and a measured power exchange level of the power converter exceeding a reference power difference threshold. The target power exchange level of the power converter may be a calculated, predicted, expected or designed power exchange level of the power converter. The measured power exchange level of the power converter may be obtain using one or more suitable sensors, such as a voltage sensor and/or a current sensor.

In further embodiments of the invention, the second activation trigger may correspond to an unavailable operating status of another dynamic braking system. This ensures selectivity between preferred and non-preferred dynamic braking systems and the same time configures the dynamic braking system to be capable of performing the dynamic braking operation in place of the unavailable dynamic braking system. In such embodiments, the second activation trigger may additionally correspond to an electrical parameter indicative of a requirement for a dynamic braking operation, such as a DC voltage of the or each power transmission medium exceeding a reference DC voltage threshold.

The unavailable operating status of a dynamic braking system may relate, but is not limited, to the other dynamic braking system:
being in a state of malfunction, e.g. due to an internal fault;
being non-responsive to a command to carry out a dynamic braking operation; or
lacking sufficient dynamic braking capacity to carry out the dynamic braking operation, e.g. due to a recent dynamic braking operation.

The dynamic braking control unit may obtain the indication of an unavailable operating status of the other dynamic braking system by:
processing and evaluating information obtained from the dynamic braking control unit of the other dynamic braking system;
processing and evaluating information obtained from an external sensor or an external controller, such as a global controller;
receiving the indication from the dynamic braking control unit of the other dynamic braking system; or
receiving the indication from an external sensor or an external controller, such as a global controller.

The electrical assembly of the invention may be further configured in a number of ways, non-limiting examples of which are set out as follows:

The electrical assembly may be configured in various configurations, such as a symmetrical monopole configuration, a rigid bipole configuration (i.e. a bipole configuration without a return path) or a bipole configuration with a return path.

The power converter may be a sending end power converter or a receiving end power converter.

The or each power transmission medium may be any medium capable of transmitting power, preferably at high voltage levels. Non-limiting examples of the or each power transmission medium include an overhead line, an under-sea cable and an underground cable.

The dynamic braking system may define a conduction path including a current flow control element and an energy dissipation or storage element. The dynamic braking control unit may be programmed to selectively control activation of the current flow control element to permit current to flow through the conduction path to carry out the dynamic braking operation.

The dynamic braking system may be configured so that its conduction path interconnects a pair of power transmission media (e.g. connected in shunt between the pair of power transmission media) or interconnects a power transmission medium and ground (e.g. connected in shunt between the power transmission medium and ground).

The conduction path may include a single current flow control element or multiple current flow control elements. The or each current flow control element may be any device that is capable of selectively permitting current to flow through the conduction path when activated and inhibiting current from flowing through the conduction path when deactivated. Non-limiting examples of the or each current flow control element include a power electronic switching element, such as an insulated-gate bipolar transistor (IGBT) or another semiconductor switching element.

The conduction path may include a single energy dissipation or storage element or multiple energy dissipation or storage elements. The or each energy dissipation element may be any device that is capable of dissipating energy when current flows through the conduction path. Non-limiting examples of the or each energy dissipation element include a resistor. The or each energy storage element may be any device that is capable of storing energy when current flows through the conduction path. Non-limiting examples of the or each energy storage element include a capacitor, a fuel cell and a battery.

The monitoring unit may be configured to monitor a single electrical parameter or multiple electrical parameters of the AC network. The monitoring unit may include, but is not limited to, one or more voltage sensors and/or one or more current sensors. In embodiments employing a plurality of monitoring units, the monitoring units may form part of a monitoring system.

The processing unit may be programmed to determine the operating state of the AC network from a single monitored electrical parameter or multiple monitored electrical parameters. In embodiments employing a plurality of processing units, the processing units may form part of a processing system.

The processing unit may be external to the dynamic braking control unit and may be configured to communicate the determined operating state of the AC network to the dynamic braking control unit.

The processing unit and the dynamic braking control unit may form part of the same controller, e.g. a local controller or a global controller, or may respectively form part of separate controllers. The processing unit may be configured to communicate with the dynamic braking control unit via telecommunications links and/or a central controller.

The processing unit may form part of a converter controller programmed to control operation of the power converter.

Preferably the dynamic braking control unit is programmed to configure the current flow control element to be:
  (i) inhibited from being activated by the second activation trigger if the AC network is in a faulty operating state; and/or
  (ii) inhibited from being activated by the first activation trigger if the AC network is in a healthy operating state.

It will be appreciated that the use of the terms "first" and "second", and the like, in this patent specification is merely intended to help distinguish between similar features, and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

Preferred embodiments of the invention will now be described, by way of non-limiting examples, with reference to the accompanying drawings in which.

The figures are not necessarily to scale, and certain features and certain views of the figures may be shown exaggerated in scale or in schematic form in the interests of clarity and conciseness.

Figure 1:
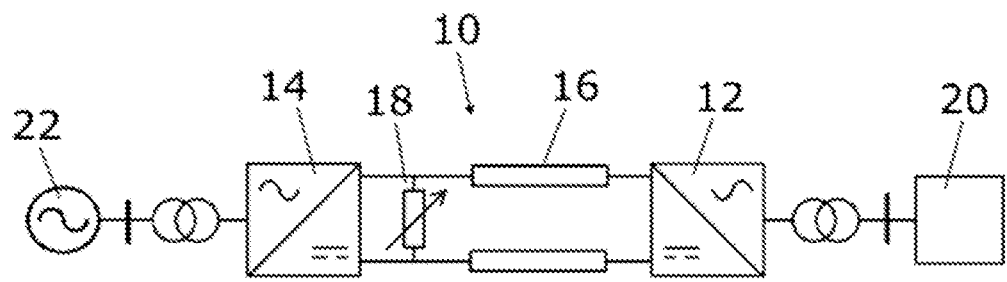
FIG. 1 shows a point-to-point power transmission scheme.

A point-to-point power transmission scheme is shown in FIG. 1 and is designated generally by the reference numeral 10.

The point-to-point power transmission scheme 10 comprises a sending end power converter 12, a receiving end power converter 14, a DC link 16 and a dynamic braking system (DBS) 18. Each of the sending end and receiving end power converters 12,14 is an AC/DC power converter. In use, an AC side of the sending end power converter 12 is connected to an AC power source 20, such as a wind farm or other energy generator, while the receiving end power converter 14 is connected to an AC power load 22, such as an AC power grid. The DC link 16 is in the form of a pair of DC power transmission lines interconnecting DC sides of the sending end and receiving end power converters 12,14. The DBS 18 defines a conduction path that is connected in shunt between the DC power transmission lines.

Operation of the point-to-point power transmission scheme 10 is described as follows. The sending end power converter 12 receives AC power from the AC power source 20 and converts it into DC power that is transferred into the DC link 16. The DC link 16 then transmits the DC power to the receiving end power converter 14 that converts it into AC power before transferring it to the AC power load 22.

To maintain safe and stable operation of the DC link 16, the net power exchange of the point-to-point power transmission scheme 10 must be zero on average, which means that power injected into the sending end power converter 12 must be matched by the power extracted from the receiving end power converter 14 as closely as possible to minimise any surplus in injected power. In the event of a significant difference between the injected power and the extracted power, the DBS 18 is activated to draw energy from the DC power transmission lines in order to avoid the need to take the point-to-point power transmission scheme 10 offline.

Unlike point-to-point power transmission schemes, multi-terminal power transmission schemes typically comprise multiple sending end power converters associated with respective AC power sources, multiple receiving end power converters associated with respective AC power loads, multiple DC links interconnecting the sending end and receiving end power converters, and multiple dynamic braking systems (DBSes) connected to respective DC links. Conventionally each DBS is typically associated with a respective receiving end power converter and hence is designed to carry out a dynamic braking operation when the corresponding receiving end power converter is incapable of transferring an expected power from the DC link to the corresponding AC power load. However, due to the nature of multi-terminal power transmission schemes, any such event adversely affecting the power transfer capability of one or more receiving end power converters will have a global effect on all DC nodes of a given multi-terminal power transmission scheme and hence might trigger activation of multiple DBSes. Furthermore, each such DBS might not be designed to carry out a dynamic braking operation during all transient events that adversely affect the power transfer capability of other receiving end power converters associated with other DBSes. It can be difficult to select a suitable rating for each individual DBS that takes into account not only ratings and control methods of other DBSes in the multi-terminal power transmission schemes but also requirements of the AC systems to which the corresponding receiving end power converters are connected.

The following embodiments of the invention are used primarily in HVDC power transmission, but it will be appreciated that the following embodiments of the invention are applicable mutatis mutandis to power transmission at other voltage levels.

Figure 2:
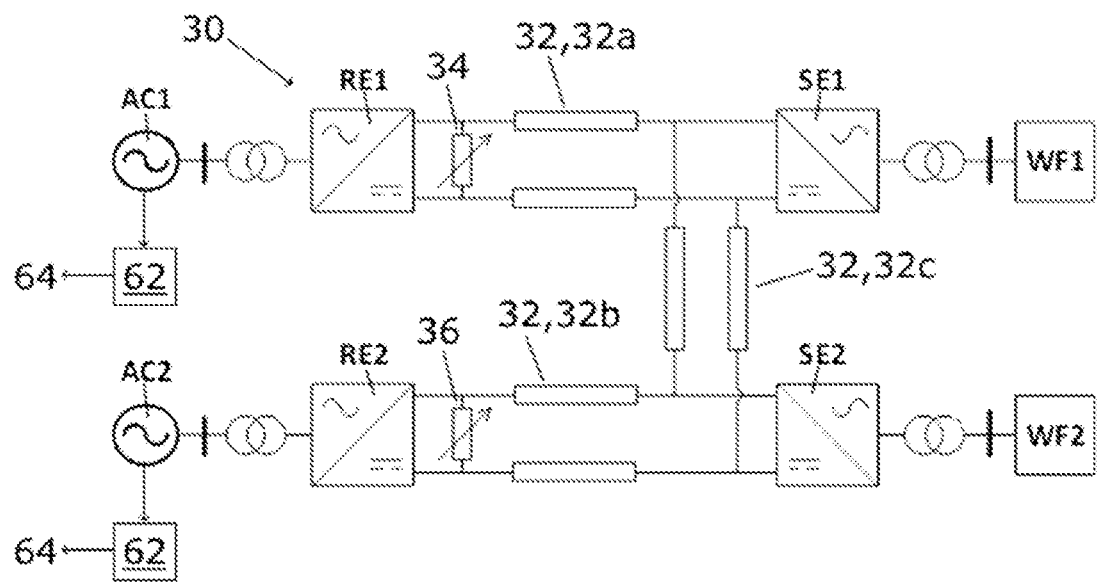
FIG. 2 shows a multi-terminal power transmission scheme according to an embodiment of the invention.

An electrical assembly in the form of a multi-terminal power transmission scheme according to an embodiment of the invention is shown in FIG. 2 and is designated generally by the reference numeral 30.

The multi-terminal power transmission scheme 30 comprises a plurality of sending end power converters SE1, SE2, a plurality of receiving end power converters RE1, RE2, a plurality of DC links 32 and a plurality of DBSes 34,36.

Each of the sending end and receiving end power converters SE1,SE2,RE1,RE2 is an AC/DC power converter having AC and DC sides.

Each power converter SE1,SE2,RE1,RE2 includes first and second DC terminals 38,40 that define the DC side of the power converter SE1,SE2,RE1,RE2. Each power converter SE1,SE2,RE1,RE2 includes a plurality of AC terminals 42 that defines the AC side of the power converter. More particularly, each power converter SE1,SE2,RE1,RE2 includes a plurality of converter limbs 44, each of which is arranged as shown in FIG. 2.

Each converter limb 44 extends between the first and second DC terminals 38,40. Each converter limb 44 includes a first limb portion 46 that extends between the first DC terminal 38 and the AC terminal 42, and a second limb portion 48 which extends between the second DC terminal 40 and the AC terminal 42.

Each limb portion 46,48 includes a plurality of series-connected switching elements 50, each of which is in the form of a thyristor. It is envisaged that, in other embodiments of the invention, the plurality of series-connected switching elements 50 in each limb portion 46,48 may be replaced by one or more other types of semiconductor switches, such as IGBTs.

It will be appreciated that the topology of each power converter SE1,SE2,RE1,RE2 is merely chosen to help illustrate the operation of the invention and that each power converter SE1,SE2,RE1,RE2 may be replaced by another converter with a different topology. For example, each power converter SE1,SE2,RE1,RE2 may be configured as a chain-link converter, such as the Modular Multilevel Converter (MMC) or the Alternate Arm Converter (AAC).

Each power converter SE1,SE2,RE1,RE2 includes a converter controller 52 that is programmed to control operation of the power converter SE1,SE2,RE1,RE2. The converter controllers 52 may be implemented as separate converter controllers 52 or may be implemented as part of the same converter control system. Each converter controller 52 may be configured to communicate with at least one other converter controller 52 via telecommunications links and/or a central controller (also known as a global controller).

In use, the AC side of each sending end power converter SE1,SE2 is connected to a respective AC power source WF1,WF2, such as a wind farm or other energy generator, via a transformer. In use, the AC side of each receiving end power converter RE1,RE2 is connected to a respective AC power load AC1,AC2, such as an AC power grid, via a transformer.

A first DC link 32,32a interconnects the DC sides of a first sending end power converter SE1 and a first receiving end power converter RE1. A second DC link 32,32b interconnects the DC sides of a second sending end power converter SE2 and a second receiving end power converter RE2. A third DC link 32,32c interconnects the DC sides of the first and second sending end power converters SE1,SE2. Each DC link 32 is in the form of a pair of DC power transmission lines. In this way the plurality of DC links 32 interconnect the DC sides of the power converters SE1,SE2,RE1,RE2 in a multi-terminal power transmission network configuration.

A first DBS 34 defines a conduction path that is connected in shunt between the DC power transmission lines of the first DC link 32,32a and is connected at the end of the first DC link 32,32a connected to the first receiving end power converter RE1. A second DBS 36 defines a conduction path that is connected in shunt between the DC power transmission lines of the second DC link 32,32b and is connected at the end of the second DC link 32,32b connected to the second receiving end power converter SE2.

Figure 3:
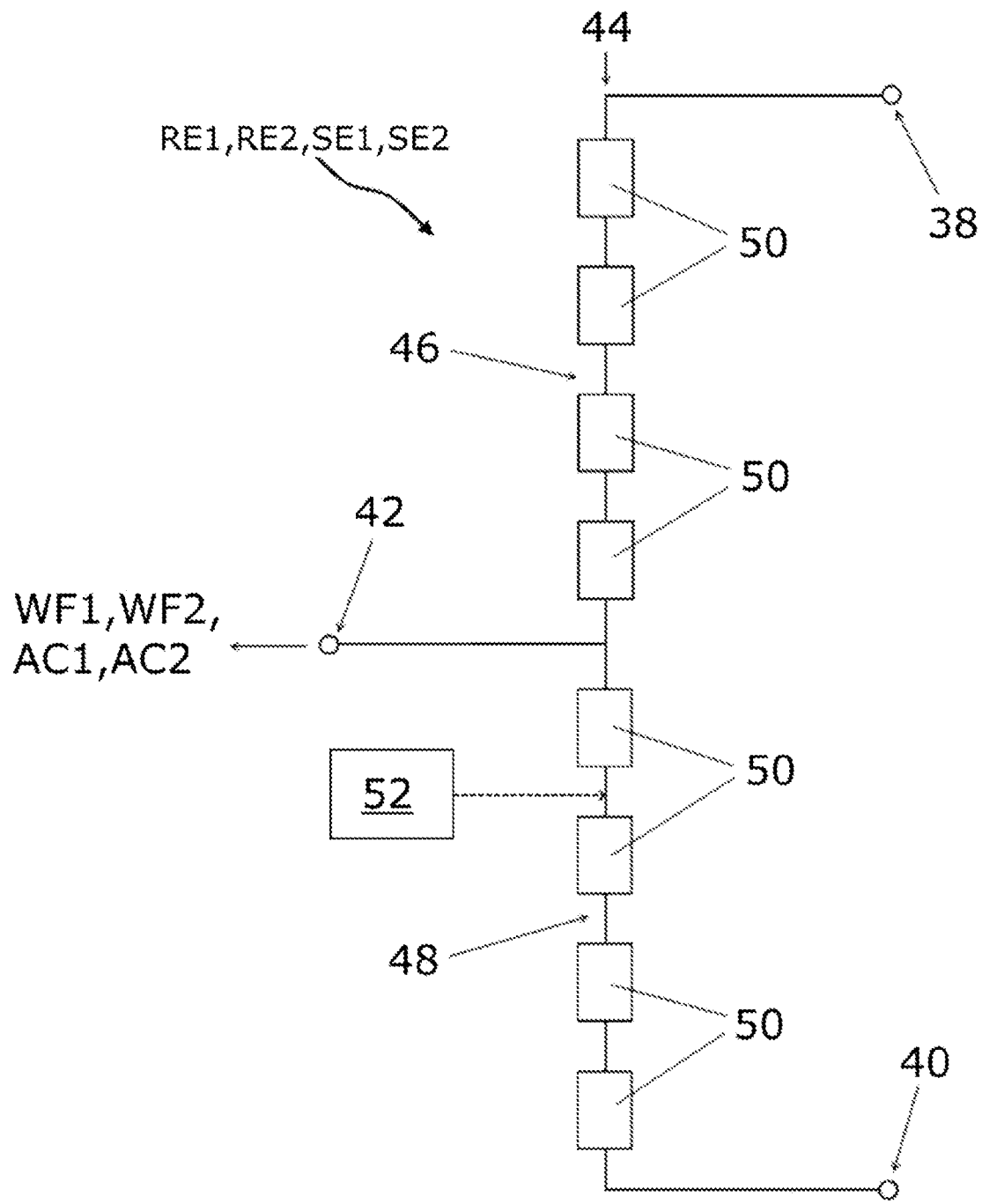
FIG. 3 shows a converter limb of a power converter of the multi-terminal power transmission scheme of FIG. 2.
Figure 4:
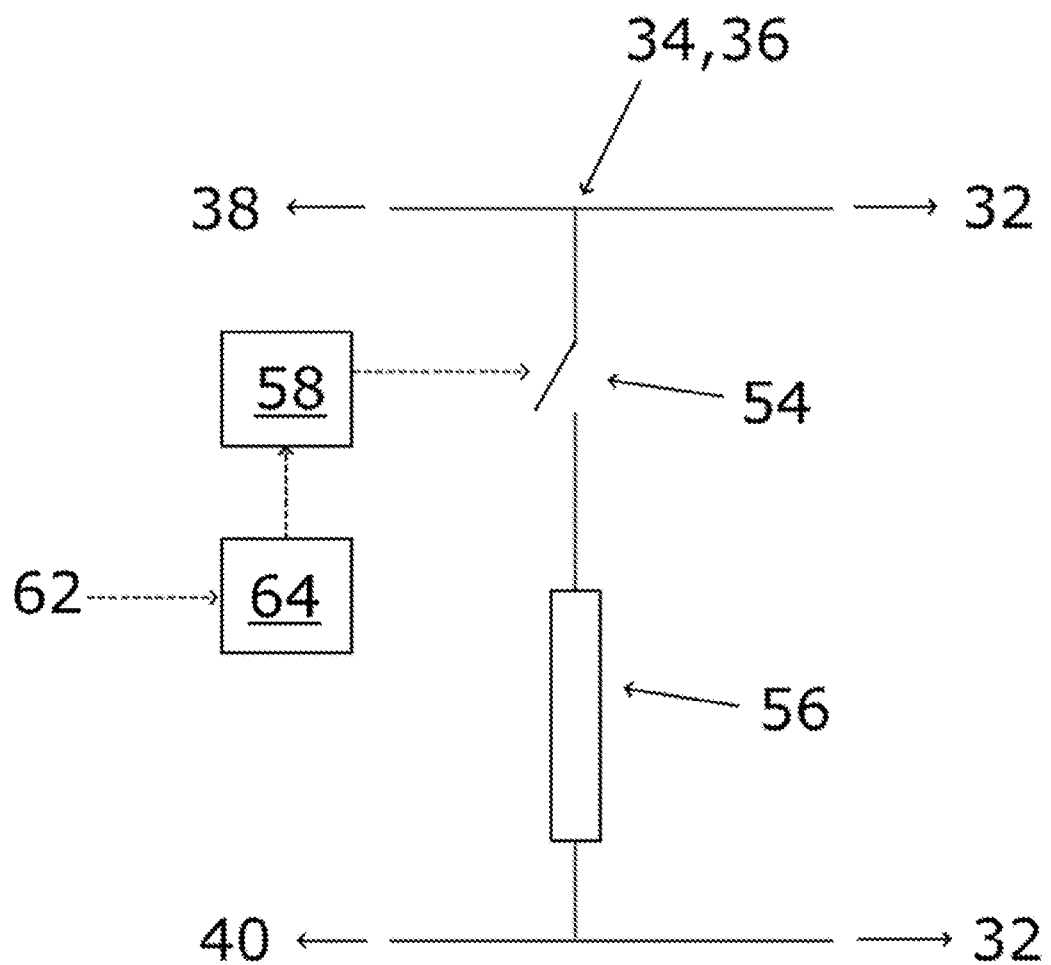
FIG. 4 shows a dynamic braking system of the multi-terminal power transmission scheme of FIG. 2.

FIG. 3 shows the structure of each DBS 34,36. The conduction path of each DBS 34,36 includes a plurality of series-connected current flow control elements 54 connected in series with an energy dissipation element 56. Each DBS 34,36 includes a dynamic braking control unit 58 programmed to selectively control activation of the current flow control elements 54 to permit current to flow through the conduction path. Each current flow control element 54 is in the form of an IGBT. In other embodiments of the invention, it is envisaged that the IGBT may be replaced by a different semiconductor switching element. The energy dissipation element 56 is in the form of a resistor. In other embodiments of the invention, it is envisaged that the energy dissipation element 56 may be replaced by a plurality of energy dissipation elements, a single energy storage element or a plurality of energy storage elements. The or each energy storage element may be a capacitor, a fuel cell or a battery.

Each DBS 34,36 is configured to have a conditional operation capability based on different activation triggers and different operating states of the AC power load AC1, AC2 connected to the corresponding receiving end power converter RE1,RE2. This enables coordination of multiple DBSes 34,36 to broaden the overall dynamic braking operation capability of the multi-terminal power transmission scheme 30, which is described as follows with reference to FIGS. 5 to 8.

Figure 5:
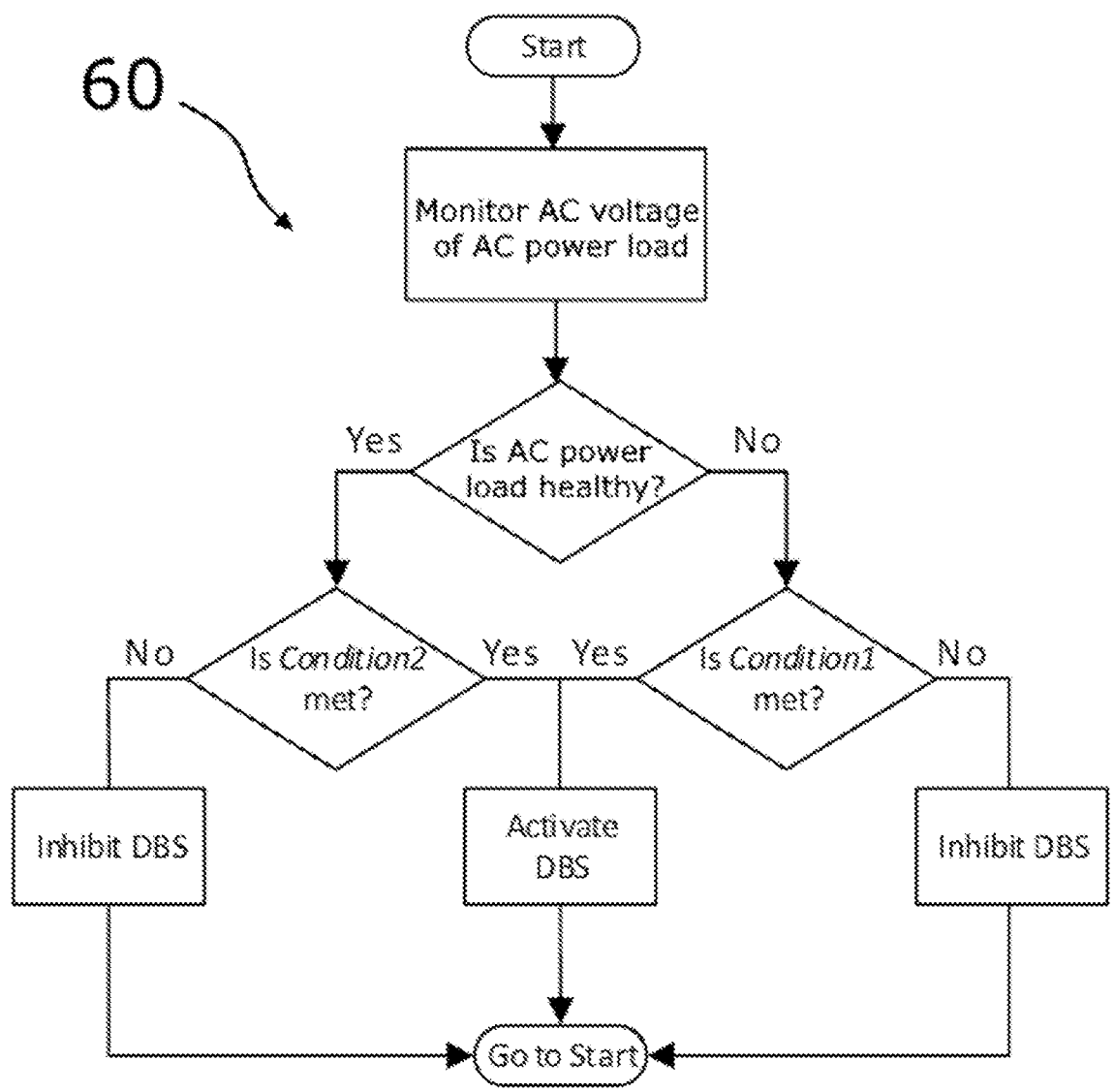
FIG. 5 shows a control algorithm for coordinating multiple dynamic braking systems of a multi-terminal power transmission scheme.

FIG. 5 shows a control algorithm 60 for the conditional operation capability of each DBS 34,36.

The multi-terminal power transmission scheme 30 includes a plurality of monitoring units 62. Each monitoring unit 62 is configured for monitoring an electrical parameter of a respective one of the AC power loads AC1,AC2. The configuration of each monitoring unit 62 depends on the type of electrical parameter of the AC power load AC1,AC2 that is being monitored. For example, each monitoring unit 62 may include a voltage sensor for monitoring an AC voltage of the AC power load AC1,AC2, or each monitoring unit 62 may include a current sensor for monitoring an AC current of the AC power load AC1,AC2.

The multi-terminal power transmission scheme 30 includes a plurality of processing units 64. Each processing unit 64 is configured to receive the monitored electrical parameter from the corresponding monitoring unit 62, e.g. via telecommunications links and/or a central controller.

Each processing unit 64 is programmed to determine an operating state of the corresponding AC power load AC1, AC2 from the corresponding monitored electrical parameter. In particular, each processing unit 64 is programmed to determine the operating state of the corresponding AC power load AC1,AC2 as a faulty operating state when the monitored electrical parameter is not at a reference electrical parameter value or is not within a reference electrical parameter range, and as a healthy operating state when the monitored electrical parameter is at a reference electrical parameter value or is within a reference electrical parameter range.

Each dynamic braking control unit 58 is programmed to be responsive to the determined operating state of the corresponding AC power load AC1,AC2 by configuring the corresponding current flow control elements 54 to be activatable by different activation triggers depending on the nature of the determined operating state of the corresponding AC power load AC1,AC2. If the determined operating state of the corresponding AC power load AC1,AC2 is a faulty operating state, then the dynamic braking control unit 58 is programmed to configure the corresponding current flow control elements 54 to be activatable by a first activation trigger and inhibited from being activated by a second activation trigger. If the determined operating state of the corresponding AC power load AC1,AC2 is a healthy operating state, then the dynamic braking control unit 58 is programmed to configure the corresponding current flow control elements 54 to be activatable by the second activation trigger and inhibited from being activated by the first activation trigger.

If the current flow control elements 54 of a given DBS 34,36 are configured to be activatable by the first activation trigger (i.e. the associated AC power load has a faulty operating state) and a first condition 'Condition1' is met, then the current flow control elements 54 of the given DBS 34,36 are activated by the first activation trigger to begin the dynamic braking operation. Similarly, if the current flow control elements 54 of the given DBS 34,36 are configured to be activatable by the second activation trigger (i.e. the associated AC power load AC1,AC2 has a healthy operating state) and a second condition 'Condition2' is met, then the current flow control elements 54 of the given DBS 34,36 are activated by the second activation trigger to begin the dynamic braking operation.

If the current flow control elements 54 of the given DBS 34,36 are configured to be activatable by the first activation trigger and a first condition 'Condition1' is not met, then the current flow control elements 54 of the given DBS 34,36 stay deactivated to inhibit the dynamic braking operation. Similarly, if the current flow control elements 54 of the given DBS 34,36 are configured to be activatable by the second activation trigger and a second condition 'Condition2' is not met, then the current flow control elements 54 of the given DBS 34,36 stay deactivated to inhibit the dynamic braking operation.

In the embodiment shown, the processing unit 64 and the dynamic braking control unit 58 form part of a local controller of the dynamic braking system 34,36. In other embodiments, it is envisaged that the processing unit 64 may be external to the dynamic braking control unit 58 and may be configured to communicate the determined operating state of the corresponding AC power load AC1,AC2 to the dynamic braking control unit 58 via telecommunications links and/or the central controller. In still other embodiments, it is envisaged that the processing unit 64 may form part of the converter controller 52.

Figure 6:
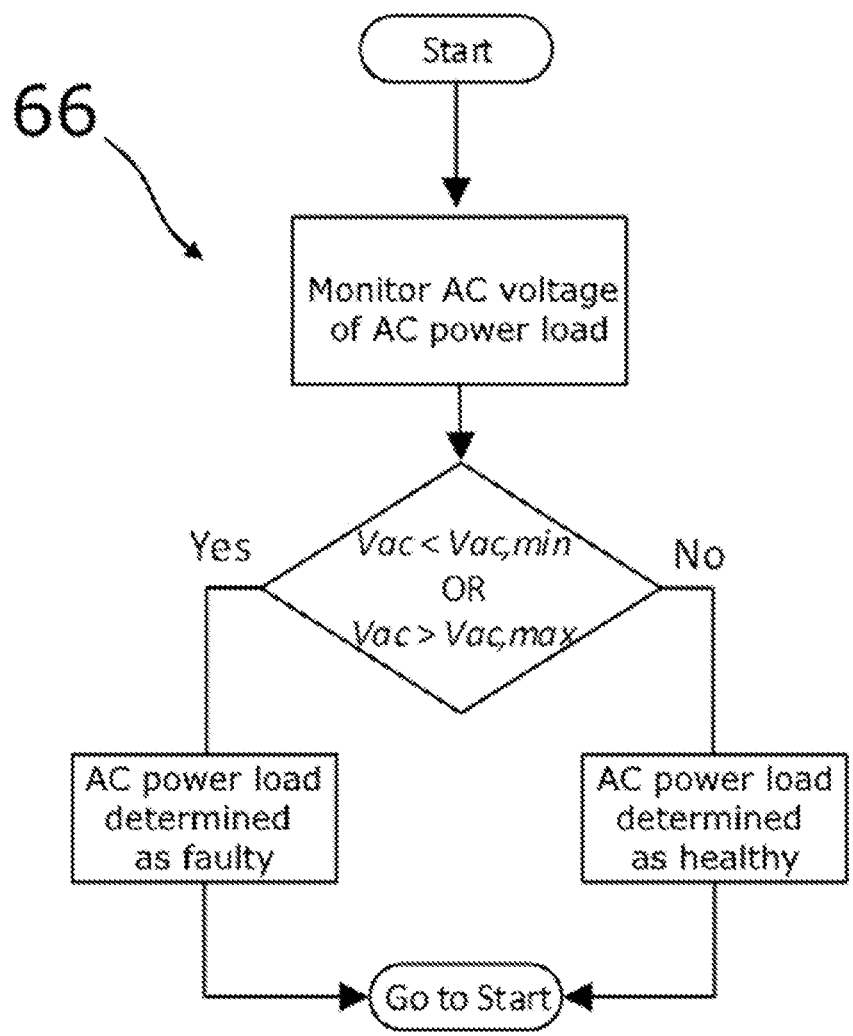
FIG. 6 shows a control algorithm for determining an operating state of an AC network of a multi-terminal power transmission scheme.

FIG. 6 illustrates a control algorithm 66 for determining an operating state of an AC power load AC1,AC2 of the multi-terminal power transmission scheme 30.

In the control algorithm 66 of FIG. 6, the operating state of the AC power load AC1,AC2 is determined by comparing its AC voltage Vac with a reference AC voltage range having a maximum AC voltage threshold Vac,max and a minimum AV voltage threshold Vac,min. The AC voltage Vac of the AC power load AC1,AC2 may be measured at, for example, a grid access point of the associated receiving end power converter RE1,RE2. The reference AC voltage range represents a normal AC voltage operating range of the AC power load AC1,AC2. If the AC voltage Vac is within the reference AC voltage range, then the AC power load AC1,AC2 is determined to have a healthy operating state. If the AC voltage Vac is lower or higher than the reference AC voltage range, then the AC power load AC1,AC2 is determined to have a faulty operating state.

In embodiments of the invention, other non-limiting ways of determining the operating state of the AC power load AC1,AC2 is by configuring the monitoring unit to monitor one or more of: an impedance of the AC power load AC1,AC2, an AC current of the AC power load AC1,AC2, a rate of change of AC current of the AC power load AC1,AC2, a frequency of the AC power load AC1,AC2 and a rate of change of frequency of the AC power load AC1,AC2. It will be appreciated that the control algorithm 62 of FIG. 6 applies mutatis mutandis to these other electrical parameters of the AC power load AC1,AC2.

Figure 7:
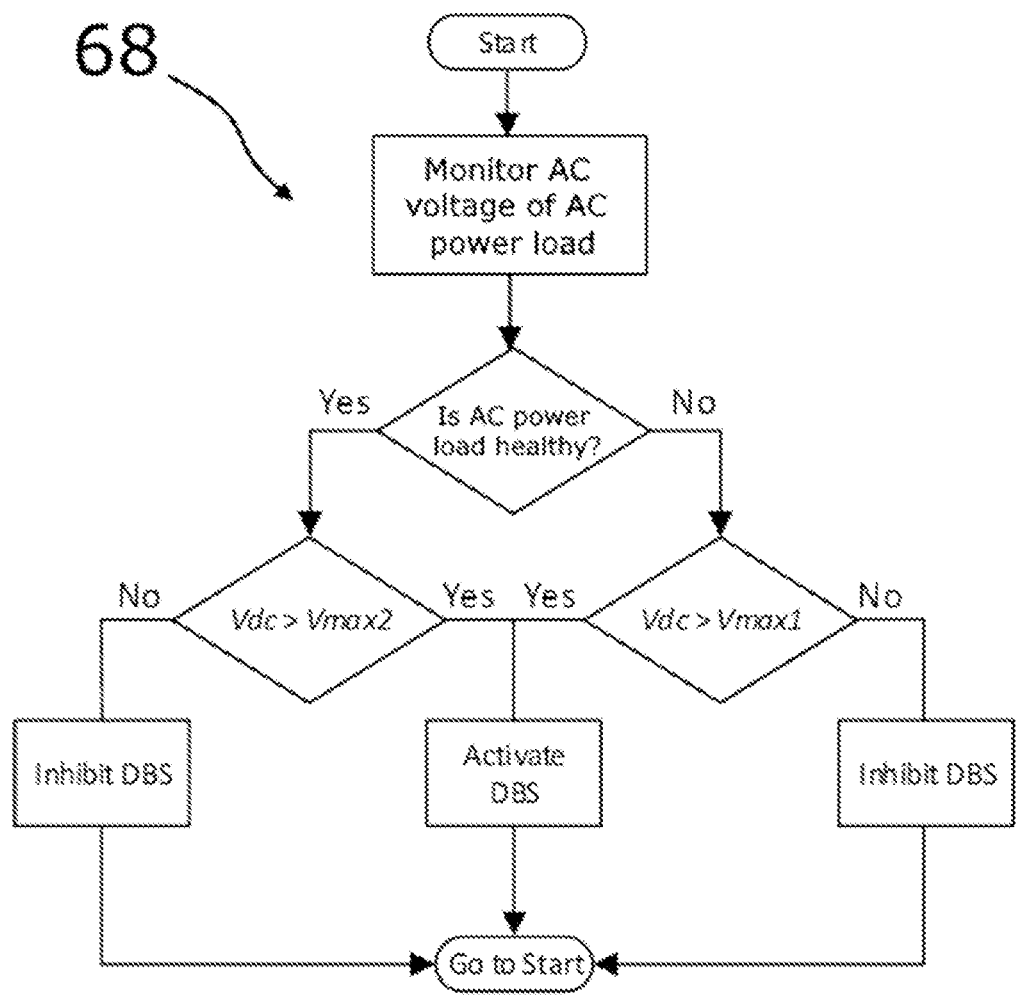
FIGS. 7 and 8 show specific implementations of the control algorithm of FIG. 5.

FIG. 7 illustrates a control algorithm 68 for the conditional operation capability of each DBS 34,36. Each processing unit 64 determines the operating state of the corresponding AC power load AC1,AC2 as being faulty or healthy in accordance with the control algorithm 66 of FIG. 6. Each DBS 34,36 includes a voltage sensor for measuring a DC voltage of the corresponding DC link 32, i.e. a DC voltage across the conduction path. Such voltage measurement may be continuous, discontinuous or intermittent. It will be appreciated that the voltage sensor may be external to the DBS 34,36.

The first activation trigger of each DBS 34,36 is configured to correspond to the DC voltage of the corresponding DC link 32 exceeding a first reference DC voltage threshold. The first reference DC voltage threshold is set above a steady-state operating DC voltage of the DC link 32 and is typically set to be equal or higher than the highest allowed continuous operating voltage of the DC link 32.

For a given DBS 34,36, if the associated AC power load AC1,AC2 has a faulty operating state and the DC voltage of the corresponding DC link 32 exceeds the first reference DC voltage threshold, then the current flow control elements 54 are activated by the first activation trigger to begin the dynamic braking operation. On the other hand, if the associated AC power load AC1,AC2 has a faulty operating state and the DC voltage of the corresponding DC link 32 does not exceed the first reference DC voltage threshold, then the current flow control elements 54 of the given DBS 34,36 stay deactivated to inhibit the dynamic braking operation.

An example operating scenario illustrating the coordination of multiple DBSes 34,36 of the multi-terminal power transmission scheme 30 is described as follows, with reference to FIG. 7.

Both sending end power converters SE1,SE2 inject positive powers PSE1,PSE2 into the respective DC links 32. Both receiving end power converters RE1,RE2 extract positive powers PRE1,PRE2 from the respective DC links 32. Ignoring system losses, the total power extracted by the receiving end power converters RE1,RE2 is equal to the total power injected by the sending end power converters SE1,SE2: PRE1+PRE2=PSE1+PSE2. Under such circumstances, the net power of the DC links 32 is zero. Hence, it can be assumed that the DC voltage Vdc of each DC link 32 is controlled within a normal operating range close to a nominal value. Since none of the DBSes 34,36 would detect any DC overvoltage condition of the corresponding DC links 32, none of the DBSes 34,36 would be activated to carry out a dynamic braking operation.

If an AC fault occurs in the AC power load AC1 so that the AC voltage at the grid access point of the receiving end power converter RE1 is reduced to practically zero, then the power PRE1 extracted by the receiving end power converter RE1 would also be reduced to zero. This causes the net power injected into the DC links 32 to exceed the power extracted by the receiving end power converters RE1,RE2 by a pre-fault value of PRE1. This in turn leads to a rapid increase of the DC voltages Vdc of the DC links 32, which will be detected by both DBSes 34,36 when their respective first reference DC voltage thresholds Vmax1 are exceeded. It will be understood that an AC power load voltage reduction due to a fault can have various degrees of severity ranging from a very small reduction just below a normal voltage range to a complete voltage collapse as described.

Since the AC power load AC1 associated with the receiving end power converter RE1 is determined to be faulty, the DBS 34 associated with the receiving end power converter RE1 is activated by the first activation trigger to carry out the dynamic braking operation and thereby dissipate the excess power. Meanwhile, since the AC power load AC2 associated with the receiving end power converter RE2 is determined to be healthy, the DBS 36 associated with the receiving end power converter RE2 is inhibited from being activated by the first activation trigger and thereby does not carry out the dynamic braking operation provided that its current flow control elements 54 are not activated by the second activation trigger.

Analogously, if an AC fault occurs in the AC power load AC2 while the AC power load AC1 stays healthy, then the DBS 36 associated with the receiving end power converter RE2 is activated by the first activation trigger to carry out the dynamic braking operation while the DBS 34 associated with the receiving end power converter RE1 is inhibited from being activated by the first activation trigger provided that its current flow control elements are not activated by the second activation trigger.

In this way, if an AC fault occurs in a given AC power load AC1,AC2, the DBS 34,36 associated with the corresponding receiving end power converter RE1,RE2 is the preferred DBS for carrying out the dynamic braking operation while the DBS 34,36 associated with the other receiving end power converter RE1,RE2 is the non-preferred DBS for carrying out the dynamic braking operation.

Optionally the first activation trigger may correspond to a power difference between a target power exchange level of the corresponding receiving end power converter RE1,RE2 and a measured power exchange level of the corresponding receiving end power converter RE1,RE2 exceeding a reference power difference threshold. The target power exchange level of the receiving end power converter RE1,RE2 may be a calculated, predicted, expected or designed power exchange level of the receiving end power converter RE1, RE2. If the power difference stays below the reference power difference threshold, then the measured power exchange level is considered to be close enough to the target power exchange level to enable normal operation of the receiving end power converter RE1,RE2.

Referring to the previous example operating scenario, the reduction in power PRE1 extracted by the receiving end power converter RE1 to zero would result in the power difference exceeding the reference power difference threshold. This in turn leads to the DBS 34 associated with the receiving end power converter RE1 being activated by the first activation trigger to carry out the dynamic braking operation. Meanwhile the DBS 36 associated with the receiving end power converter RE2 is inhibited from being activated by the first activation trigger because the power PRE2 extracted by the receiving end power converter RE2 is unchanged, which means that the power difference between a target power exchange level of the receiving end power converter RE2 and a measured power exchange level of the receiving end power converter RE2 stays below the reference power difference threshold.

The provision of the second activation trigger enables a given DBS 34,36 to respond to an event of a remote faulty AC power load in case the preferred DBS 34,36 is unavailable for dynamic braking operation. More particularly, the second activation trigger is configured to correspond to the DC voltage Vdc of the corresponding DC link 32 exceeding a second reference DC voltage threshold Vmax2 that is higher than the first reference DC voltage threshold Vmax1. If the DC voltage Vdc of the DC link 32 exceeds the second reference DC voltage threshold Vmax2, the current flow control elements 54 of the associated DBS 34,36 are activated by the second activation trigger provided that the associated AC power load AC1,AC2 is determined to be healthy.

Setting the second reference DC voltage threshold Vmax2 to be higher than the first reference DC voltage threshold Vmax1 allows the preferred DBS 34,36, i.e. the DBS 34,36 associated with the faulty AC power load, to respond first based on activation by the first activation trigger provided that the preferred DBS 34,36 is available for dynamic braking operation.

Referring to the previous example operating scenario, when the AC fault occurs in the AC power load AC1, the DBS 34 associated with the receiving end power converter RE1 carries out the dynamic braking operation based on activation by the first activation trigger while the DBS 36 associated with the receiving end power converter RE2 is inhibited from being activated by the first activation trigger but is activatable by the second activation trigger due to the associated AC power load AC2 being healthy. However, if the DBS 34 associated with the receiving end power converter RE1 is not available (e.g. due to a malfunction or lacking sufficient energy dissipation capability), the DC voltage Vdc of the DC links 32 will continue to rise due to the non-zero net power of the DC links 32 until it exceeds the second reference DC voltage threshold Vmax2. At this point the DBS 36 associated with the receiving end power converter RE2 carries out the dynamic braking operation based on activation by the second activation trigger, as shown in FIG. 7.

As a result of the second reference DC voltage threshold Vmax2 being higher than the first reference DC voltage threshold Vmax1, the voltage stress experienced by the multi-terminal power transmission scheme 30 during the dynamic braking operation of a DBS 34,36 activated by the second activation trigger would be higher than the voltage stress experienced by the multi-terminal power transmission scheme 30 during the dynamic braking operation of the DBS 34,36 activated by the first activation trigger.

To reduce the voltage stress on the multi-terminal power transmission scheme 30, the dynamic braking control unit 58 may be programmed to reduce the first reference DC voltage threshold Vmax1 if the determined operating state of the AC power load AC1,AC2 is a faulty operating state. Preferably the dynamic braking control unit 58 is programmed to configure the first reference DC voltage threshold Vmax1 as a function of an AC voltage of the AC power load AC1,AC2 so as to:

(i) reduce the first reference DC voltage threshold Vmax1 when the AC voltage of the AC power load AC1,AC2 is not at a reference AC voltage value or is not within a reference AC voltage range; and (ii) maintain the first reference DC voltage threshold Vmax1 when the AC voltage of the AC power load AC1,AC2 is at a reference AC voltage value or is within a reference AC voltage range.

Furthermore, the reduction of the first reference DC voltage threshold Vmax1 may be proportional to a difference between the AC voltage of the AC power load AC1, AC2 and the reference AC voltage value or range. Hence, for a less severe AC fault in the AC power load AC1,AC2 resulting in a smaller AC voltage reduction, a corresponding reduction is applied to the first reference DC voltage threshold Vmax1.

This approach has the benefit of permitting a reduction of the second reference DC voltage threshold Vmax2 to reduce stress on the multi-terminal power transmission scheme while maintaining a sufficiently large voltage offset between the first and second reference DC voltage thresholds Vmax1, Vmax2 to ensure selectivity between preferred and non-preferred DBSes 34,36 to enable a preferred DBS 34,36, if available, to activate first before a non-preferred DBS 34,36.

Optionally the first reference DC voltage threshold Vmax1 may be configured to have a first time-varying DC voltage profile in which the first reference DC voltage threshold Vmax1 increases with time. This not only helps to initially maintain the desired selectivity between preferred and non-preferred DBSes 34,36 but also allows the reduced first reference DC voltage threshold Vmax1 to eventually return to its original value.

Selectivity between preferred and non-preferred DBSes 34,36 may be further enhanced by programming the dynamic braking control unit 58 to configure the current flow control elements 54 to be: activatable by the first activation trigger and inhibited from being activated by the second activation trigger during an activation time delay; and activatable by the second activation trigger after the activation time delay.

Optionally the second reference DC voltage threshold Vmax2 may be configured to have a second time-varying DC voltage profile in which the second reference DC voltage threshold Vmax2 decreases with time. This not only helps to initially maintain the desired selectivity between preferred and non-preferred DBSes 34,36 but also reduces voltage stress on the multi-terminal power transmission scheme 30 if it turns out that the non-preferred DBS 34,36 is required to carry out the dynamic braking operation.

Figure 8:
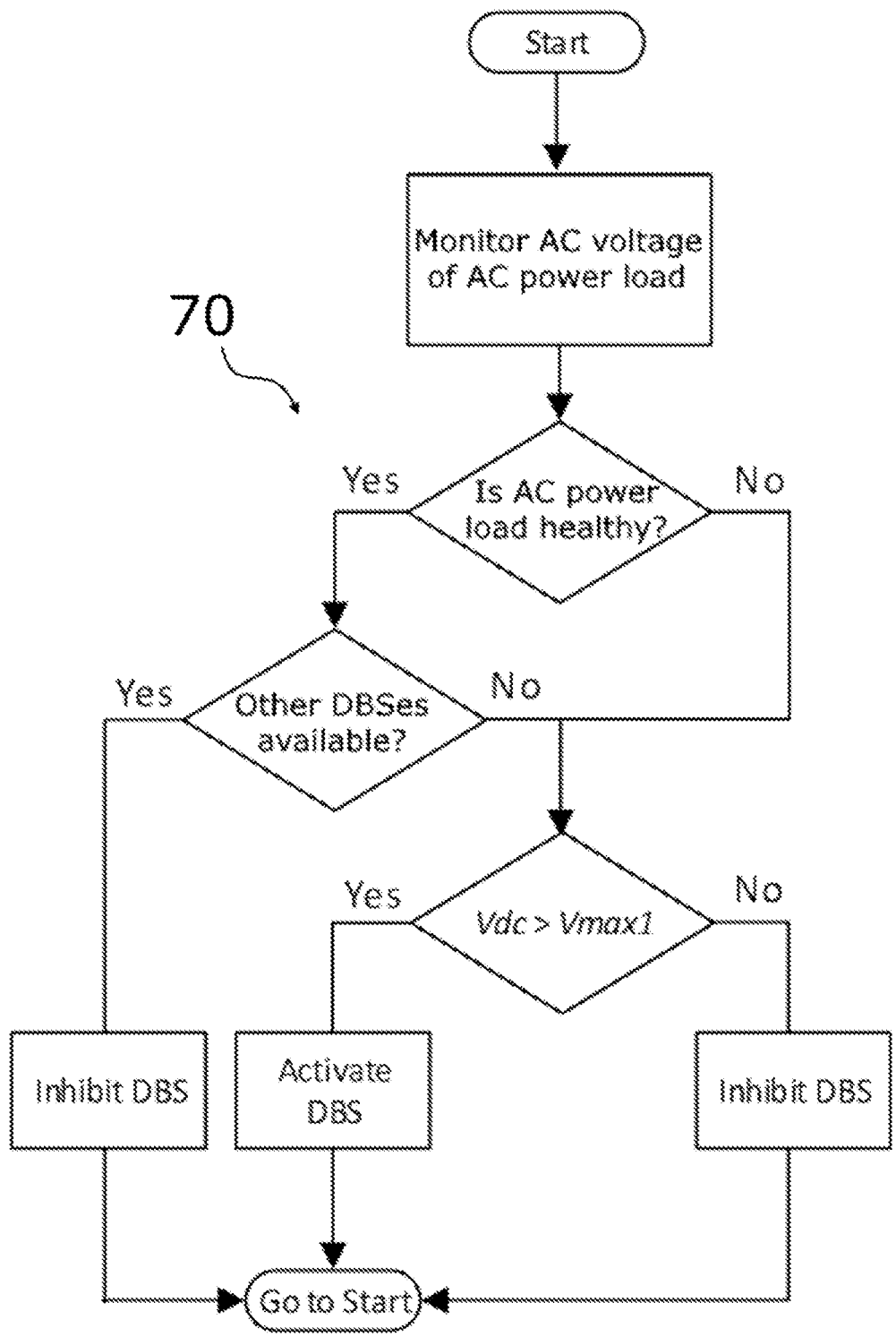

FIG. 8 illustrates another control algorithm 70 for the conditional operation capability of each DBS 34,36. Each processing unit 64 determines the operating state of the corresponding AC power load AC1,AC2 as being faulty or healthy in accordance with the control algorithm 66 of FIG. 6. The first activation trigger of each DBS 34,36 is configured to correspond to the DC voltage Vdc of the corresponding DC link 32 exceeding the first reference DC voltage threshold Vmax1.

In the control algorithm 70 of FIG. 8, the second activation trigger for a given DBS 34,36 corresponds to a combination of an unavailable operating status of the other DBS 34,36 and the DC voltage Vdc of the corresponding DC link 32 exceeding the first reference DC voltage threshold Vmax1. Specifically, the control algorithm 70 first checks whether an indication of an unavailable operating status of the other DBS 34,36 has been obtained. If the other DBS has an available operating status, then the given DBS is not activated by the second activation trigger. If the other DBS 34,36 has an unavailable operating status, the control algorithm then checks whether the DC voltage Vdc of the corresponding DC link 32 exceeds the first reference DC voltage threshold Vmax1. If the DC voltage Vdc of the corresponding DC link 32 exceeds the first reference DC voltage threshold Vmax1, then the given DBS 32 is activated by the second activation trigger to carry out the dynamic braking operation. If the DC voltage Vdc of the corresponding DC link 32 does not exceed the first reference DC voltage threshold Vmax1, then the given DBS 32 is not activated by the second activation trigger.

Thus, in this way, if the other DBS 34,36 is deemed to be unavailable, the available DBS 34,35 is permitted to be activated by the DC voltage Vdc of the corresponding DC link 32 exceeding the first reference DC voltage threshold Vmax1 irrespective of whether the corresponding AC power load AC1,AC2 is faulty or healthy.

This approach maintains the desired selectivity between preferred and non-preferred DBSes 34,36 while using the first reference DC voltage threshold Vmax1 as a means for selective activation of the DBSes 34,36, which has the effect of reducing voltage stress on the multi-terminal power transmission scheme 30.

The unavailable operating status of a DBS 34,36 may relate, but is not limited, to the other DBS 34,36:

being in a state of malfunction;

being non-responsive to a command to carry out a dynamic braking operation; or lacking sufficient energy dissipation capacity to carry out the dynamic braking operation.

The dynamic braking control unit 58 may obtain the indication of an unavailable operating status of the other DBS 34,36, e.g. via telecommunications links, by:

processing and evaluating information obtained from the dynamic braking control unit 58 of the other DBS 34,36;

processing and evaluating information obtained from an external sensor or an external controller, such as a global controller;

receiving the indication from the dynamic braking control unit 58 of the other DBS 34,36; or receiving the indication from an external sensor or an external controller, such as a global controller.

Referring to the previous example operating scenario, if the DBS 34 associated with the receiving end power converter RE1 has an unavailable operating status, then the DBS 36 associated with the other receiving end power converter RE2 will be activated by the second activation trigger even though its associated AC power load AC2 is deemed to be healthy.

Figure 9:
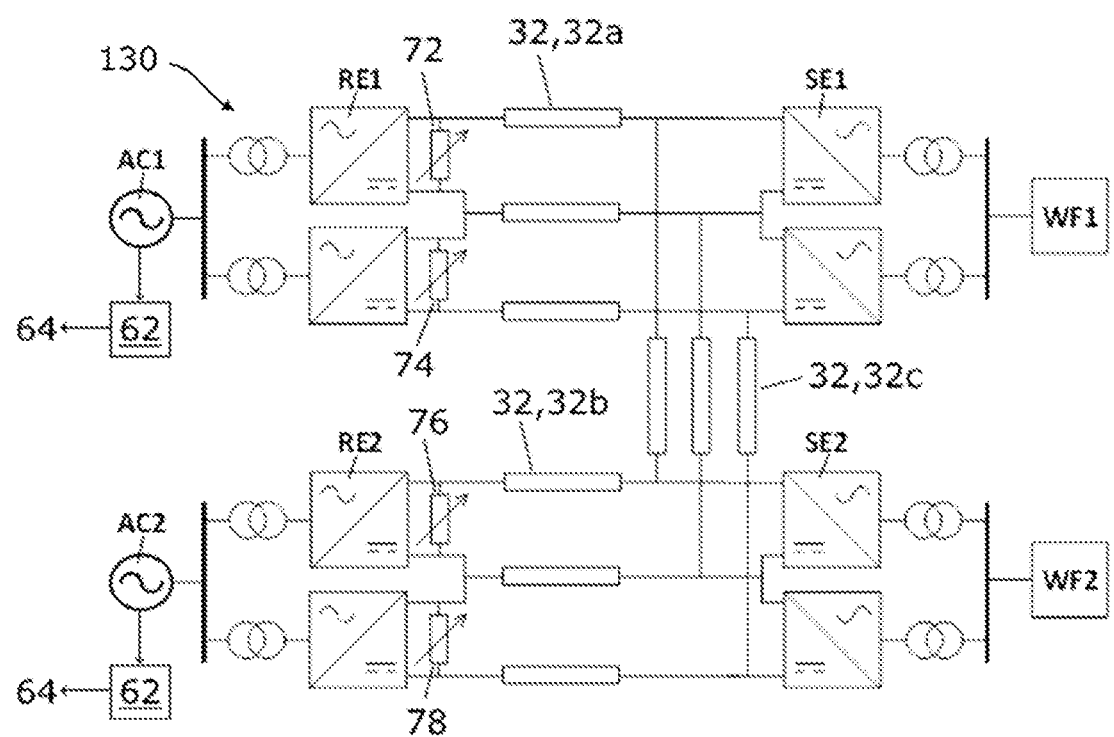
FIG. 9 shows a multi-terminal power transmission scheme according to another embodiment of the invention.

An electrical assembly in the form of a multi-terminal power transmission scheme according to another embodiment of the invention is shown in FIG. 9 and is designated generally by the reference numeral 130. The multi-terminal power transmission scheme 130 of FIG. 9 is similar in structure and operation to the multi-terminal power transmission scheme 30 of FIG. 2 and like features share the same reference numerals.

The multi-terminal power transmission scheme 130 of FIG. 9 differs from the multi-terminal power transmission scheme 30 of FIG. 2 in that the multi-terminal power transmission scheme 130 of FIG. 9 is configured in a bipole configuration with a return path in which:

each DC link 32 comprises two DC power transmission lines and a return conductor that interconnect the corresponding power converters SE1,SE2,RE1,RE2;

a respective DBS 72,74,76,78 defines a conduction path connected in shunt between one of the DC power transmission lines and the return conductor so that each AC power load AC1,AC2 is associated with two DBSes 72,74,76,78.

The inventors have therefore devised a solution that configures the activation of each DBS 34,36,72,74,76,78 to be more selective towards its own receiving end. In addition, the provision of the second activation trigger allows utilisation of any remaining capability of one or more non-preferred DBSes 34,36,72,74,76,78 to carry out the dynamic braking operation and thereby enables the electrical assembly 30,130 of the invention to be responsive to circumstances in which the preferred DBS 34,36,72,74,76,78 is unavailable. Hence, the use of the first and second activation triggers for triggering DBS activation avoids the risk of outage of an entire multi-terminal power transmission scheme due to the non-availability of a preferred DBS and due to each DBS being only capable of responding to fault events affecting the corresponding AC power load.

The difference between the coordinated multiple DBS control of the invention and the conventional uncoordinated multiple DBS control is that the former involves activation of a non-preferred DBS in response to a remote network event only under some specific circumstances, which in certain configurations of the invention can be rare, while the latter involves activation of multiple DBSes in response to a remote network event every time due to the global effect of a fault affecting the power transfer capability of a given receiving end power converter.

As a result of the foregoing, design requirements of each DBS 34,36,72,74,76,78 can be optimised to deliver a certain minimum performance as required by the corresponding receiving end power converter RE1,RE2 and AC power load AC1,AC2 with which it is associated, where the influence of other receiving end power converters RE1,RE2 and AC power loads AC1,AC2 on such design requirements are significantly reduced.

Operation of the multi-terminal power transmission scheme 130 of FIG. 9 has been demonstrated through a set of Electromagnetic Transients (EMT) simulations. In the simulations, the operating state of each AC power load AC1,AC2 was determined in accordance with the control algorithm 66 of FIG. 6, and each DBS 72,74,76,78 is controlled in accordance with the control algorithm 68 of FIG. 7. To demonstrate that the invention provides a coordinated response of the DBSes 72,74,76,78, the following test scenarios were simulated:

a. A solid three-phase AC fault at the grid access point of the receiving end power converter RE1;
b. A solid three-phase AC fault at the grid access point of the receiving end power converter RE2;
c. A protective trip of a positive pole at the receiving end power converter RE1 and the associated DBS 72,74;
d. A protective trip of a positive pole at the receiving end power converter RE2 and the associated DBS 76,78.

The simulations of the test scenarios were done for full load conditions, i.e. with 1 per-unit power injected by each sending end power converter SE1,SE2 and with 1 per-unit power transferred by each receiving end power converter RE1,RE2 to its associated AC power load.

The simulation results for the first two tests confirmed that the DBSes 72,74,76,78 associated with the faulty AC power load AC1,AC2 responded first to carry out the dynamic braking operation. The simulation results for the second two tests confirmed that, in the event of an outage at a receiving end power converter RE1,RE2, the DBSes 72,74,76,78 associated with the other unaffected receiving end power converter RE1,RE2 is activated to carry out the dynamic braking operation although the associated AC power load AC1,AC2 is in a healthy operating state.

Although the multi-terminal power transmission schemes 30,130 are described with reference to DBSes 34,36,72,74, 76,78 associated with receiving end power converters, the multi-terminal power transmission schemes 30,130 may alternatively or additionally include dynamic braking systems associated with sending end power converters SE1, SE2, where one or more of the dynamic braking systems associated with the sending end power converters SE1,SE2 may be configured to have the conditional operation capability based on different activation triggers and different operating states of the AC power sources WF1,WF2.

Non-limiting examples of additional or alternative features of the electrical assembly of the invention are described throughout the specification. One or more of the additional and alternative features may be applied to, or incorporated into, the multi-terminal power transmission schemes 30,130.

It will be appreciated that the above numerical values are merely intended to help illustrate the working of the invention and may vary depending on the requirements of the multi-terminal power transmission schemes 30,130.

It will be further appreciated that the topologies of the multi-terminal power transmission schemes 30,130 are merely chosen to help illustrate the working of the invention and may be replaced by other suitable power transmission scheme topologies.

The listing or discussion of an apparently prior-published document or apparently prior-published information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. An electrical assembly, comprising:
   a power converter having an AC side and a DC side, the AC side for connection to an AC network;
   at least one power transmission medium connected to the DC side of the power converter;
   a dynamic braking system operably connected to the or each power transmission medium, the dynamic braking system including a dynamic braking control unit programmed to selectively control activation of the dynamic braking system to carry out a dynamic braking operation;
   a monitoring unit for monitoring an electrical parameter of the AC network; and
   a processing unit programmed to determine an operating state of the AC network from the monitored electrical parameter, wherein the dynamic braking control unit is programmed to be responsive to the determined operating state of the AC network such that:
(i) if the determined operating state of the AC network is a faulty operating state, the dynamic braking system is configured to be activable by a first activation trigger; and
(ii) if the determined operating state of the AC network is a healthy operating state, the dynamic braking system is configured to be activable by a second activation trigger;
wherein the processing unit is programmed to determine the operating state of the AC network as:
(i) the faulty operating state when the monitored electrical parameter is not at a reference electrical parameter value or is not within a reference electrical parameter range; and
(ii) the healthy operating state when the monitored electrical parameter is at the reference electrical parameter value or is within the reference electrical parameter range.

2. The electrical assembly according to claim 1, wherein the first activation trigger corresponds to a DC voltage of the or each power transmission medium exceeding a first reference DC voltage threshold.

3. The electrical assembly according to claim 2, wherein the dynamic braking control unit is programmed to reduce the first reference DC voltage threshold if the determined operating state of the AC network is the faulty operating state.

4. The electrical assembly according to claim 2, wherein the dynamic braking control unit is programmed to configure the first reference DC voltage threshold as a function of an AC voltage of the AC network.

5. The electrical assembly according to claim 4, wherein the dynamic braking control unit is programmed to:
(i) reduce the first reference DC voltage threshold when the AC voltage of the AC network is not at a reference AC voltage value or is not within a reference AC voltage range; and
(ii) maintain the first reference DC voltage threshold when the AC voltage of the AC network is at the reference AC voltage value or is within the reference AC voltage range.

6. The electrical assembly according to claim 5, wherein the dynamic braking control unit is programmed to reduce the first reference DC voltage threshold by an amount proportional to a difference between the AC voltage of the AC network and the reference AC voltage value or the reference AC voltage range when the AC voltage of the AC network is not at the reference AC voltage value or is not within the reference AC voltage range.

7. The electrical assembly according to claim 2, wherein the first reference DC voltage threshold is configured to have a first time-varying DC voltage profile in which the first reference DC voltage threshold varies with time.

8. The electrical assembly according to claim 2, wherein the second activation trigger corresponds to a DC voltage of the or each power transmission medium exceeding a second reference DC voltage threshold.

9. The electrical assembly according to claim 8, wherein the second reference DC voltage threshold is higher than the first reference DC voltage threshold.

10. The electrical assembly according to claim 8, wherein the second reference DC voltage threshold is configured to have a second time-varying DC voltage profile in which the second reference DC voltage threshold varies with time.

11. The electrical assembly according to claim 1, wherein the dynamic braking control unit is programmed to configure the dynamic braking system to:
(i) be activatable by the first activation trigger and inhibited from being activated by the second activation trigger during an activation time delay; and
(ii) be activatable by the second activation trigger after the activation time delay.

12. An electrical assembly, comprising:
a power converter having an AC side and a DC side, the AC side for connection to an AC network;
at least one power transmission medium connected to the DC side of the power converter;
a dynamic braking system operably connected to the or each power transmission medium, the dynamic braking system including a dynamic braking control unit programmed to selectively control activation of the dynamic braking system to carry out a dynamic braking operation;
a monitoring unit for monitoring an electrical parameter of the AC network; and
a processing unit programmed to determine an operating state of the AC network from the monitored electrical parameter, wherein the dynamic braking control unit is programmed to be responsive to the determined operating state of the AC network such that:
(i) if the determined operating state of the AC network is a faulty operating state, the dynamic braking system is configured to be activable by a first activation trigger; and
(ii) if the determined operating state of the AC network is a healthy operating state, the dynamic braking system is configured to be activable by a second activation trigger;
wherein the processing unit is programmed to determine the operating state of the AC network as:
(i) the faulty operating state when the monitored electrical parameter is not at a reference electrical parameter value or is not within a reference electrical parameter range; and
(ii) the healthy operating state when the monitored electrical parameter is at the reference electrical parameter value or is within the reference electrical parameter range;
wherein the first activation trigger corresponds to a DC voltage of the or each power transmission medium exceeding a first reference DC voltage threshold;
wherein the dynamic braking control unit is programmed to configure the first reference DC voltage threshold as a function of an AC voltage of the AC network;
wherein the dynamic braking control unit is programmed to:
(i) reduce the first reference DC voltage threshold when the AC voltage of the AC network is not at a reference AC voltage value or is not within a reference AC voltage range; and
(ii) maintain the first reference DC voltage threshold when the AC voltage of the AC network is at the reference AC voltage value or is within the reference AC voltage range; and
wherein the dynamic braking control unit is programmed to reduce the first reference DC voltage threshold by an amount proportional to a difference between the AC voltage of the AC network and the reference AC voltage value or the reference AC voltage range when the AC voltage of the AC network is not at the reference AC voltage value or is not within the reference AC voltage range.

\* \* \* \* \*